UNITED STATES PATENT OFFICE.

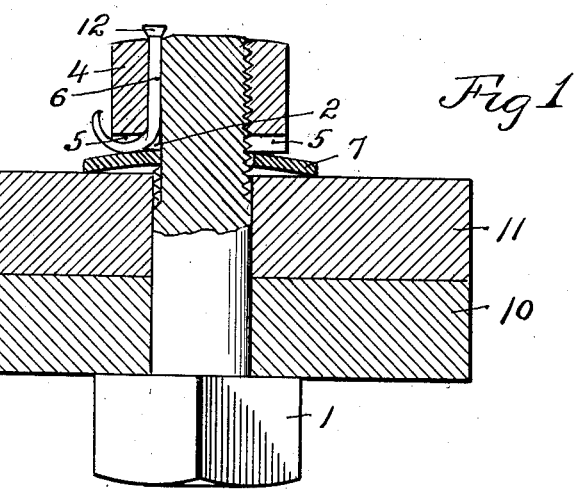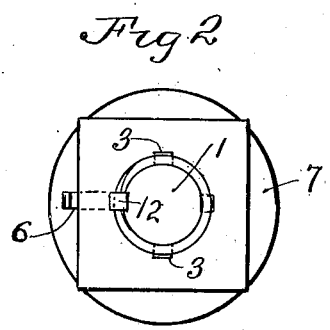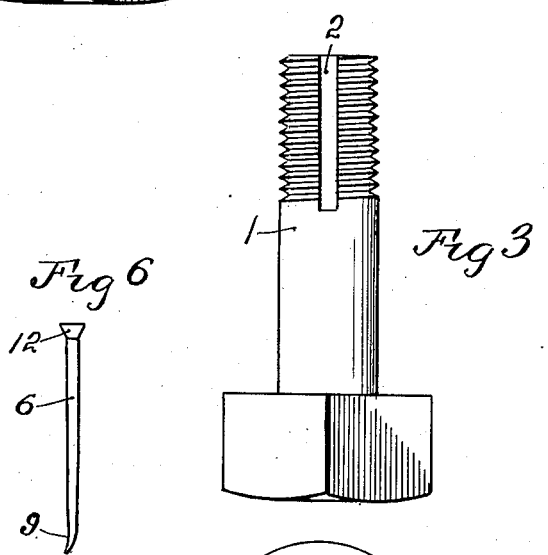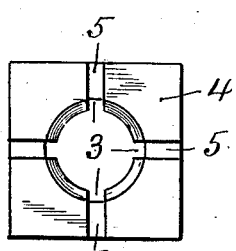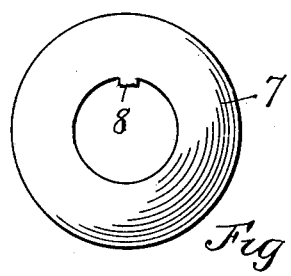

GUSTAVE N. THORSON, OF KANSAS CITY, MISSOURI.

NUT-LOCK.

1,100,105. Specification of Letters Patent. Patented June 16, 1914.

Application filed February 25, 1913. Serial No. 750,471.

*To all whom it may concern:*

Be it known that I, GUSTAVE N. THORSON, a citizen of the United States, residing at Kansas City, in the county of Jackson and State of Missouri, have invented certain new and useful Improvements in Nut-Locks, of which the following is a specification.

My invention relates to improvements in nut locks.

The object of my invention is to provide a nut lock which is cheap to manufacture, efficient in operation, and which may be quickly locked or unlocked.

In the accompanying drawings, which illustrate the preferred form of my invention, Figure 1 is a longitudinal sectional view, showing the parts in the locked position. Fig. 2 is an end view of Fig 1. Fig. 3 is a side elevation of the bolt. Fig. 4 is a view of the inner end of the nut. Fig 5 is a plan view of the washer which is adapted to form a portion of the nut lock. Fig. 6 is a side elevation of the locking key.

Similar reference characters designate similar parts.

1 designates the bolt, the threaded portion of which is provided with a longitudinal groove 2, which is adapted to register with any one of one or more longitudinal internal grooves 3, provided in the nut 4, which at the inner end, is provided with lateral grooves 5, corresponding in number to and communicating respectively with the grooves 3.

6 designates a locking key, which is bendable, and which is adapted to be driven into the groove 2 and the groove 3 which at the time register with each other. Means are provided for deflecting the inner end of the key 6 into the lateral groove 5, which at the time is in register with the groove 2. As a preferable means of so deflecting the key 6, I provide a concavo-convex washer 7, having its convex side next the nut, and which has an inwardly extending tongue 8, adapted to slip into the groove 2 of the bolt 1. As shown in Fig. 6, the locking key 6 has its inner end turned slightly laterally at 9, so that the key will be readily deflected laterally into the adjacent groove 5, when the key is driven into the groove 2 and strikes the tongue 8.

10 and 11 designate two plates through which the bolt 1 extends and which are adapted to be clamped together by means of the bolt, nut and washer.

In the operation of the invention, the bolt 1 is extended through the hole provided therefor in the plates 10 and 11, after which the washer 7 is slipped on the threaded end of the bolt with the tongue 8 disposed in the groove 2. The nut 4 is then screwed onto the bolt and against the washer 7. The nut 4 is tightened to a position in which one of its grooves 3 registers with the bolt groove 2. The locking key, in the form shown in Fig. 6, is then driven into the groove 2 and the groove 3, which is in register therewith. When the key 6 is inserted in said grooves it is disposed with the bent portion 9 turned outwardly, that is, away from the bolt. When this bent end 9 strikes the tongue 8, it will be deflected thereby laterally into the adjacent groove 5, as is shown in Fig. 1. The nut 4 will now be locked against turning on the bolt 1, and the curve which has been imparted to the key 6, when it is forcibly driven to the position shown in Fig. 1, will securely hold the key from accidental dislodgment. In case that it is desired to remove the nut 4, this may be readily done in the usual manner after the key 6 has been withdrawn. The key, which is of some material which is easily bent, such as wrought iron, or mild Bessemer steel, is preferably provided at its outer end with a head 12, which will facilitate the firm gripping of the key by the tool, not shown, which is employed to withdraw the key in a direction opposite to that in which it was driven.

My improved nut lock may be applied to various places of use. It is particularly adapted for use in connection with rail joints and in other places where there is liable to be loosening of nuts on bolts due to continual jarring.

I do not limit my invention to the structure shown and described, as many modifications, within the scope of the appended claims, may be made without departing from the spirit of my invention.

Having thus described my invention, what I claim and desire to secure by Letters Patent is:—

1. In a nut lock, a bolt having a longitudinal groove in its threaded portion, a washer adapted to encircle said bolt and provided with a tongue adapted for insertion in said groove and having a curved upper side, a nut having an internal longitudinal groove adapted to register with the bolt groove and provided with a lateral groove communicating with the longitudinal groove of the nut and located at the end of the nut which is adjacent to the washer, and a bendable key adapted to be driven into said longitudinal grooves and to be deflected by said curved upper side of the washer into said lateral groove.

2. In a nut lock, a bolt having a longitudinal groove in its threaded portion, a concavo-convex washer encircling the bolt and having a tongue extending into said groove, a nut fitted to the bolt and having at the end adjacent to the washer a lateral groove adapted to communicate with the bolt groove, and a bendable key adapted, when driven into said bolt groove, to be deflected by said washer into said lateral groove.

In testimony whereof I have signed my name to this specification in presence of two subscribing witnesses.

GUSTAVE N. THORSON.

Witnesses:
WARREN D. HOUSE,
E. B. HOUSE.

Copies of this patent may be obtained for five cents each, by addressing the "Commissioner of Patents, Washington, D. C."